March 5, 1963
H. S. BORKOVITZ
3,080,517
ELECTRICAL POWER CONTROL CIRCUITS
Filed June 15, 1960
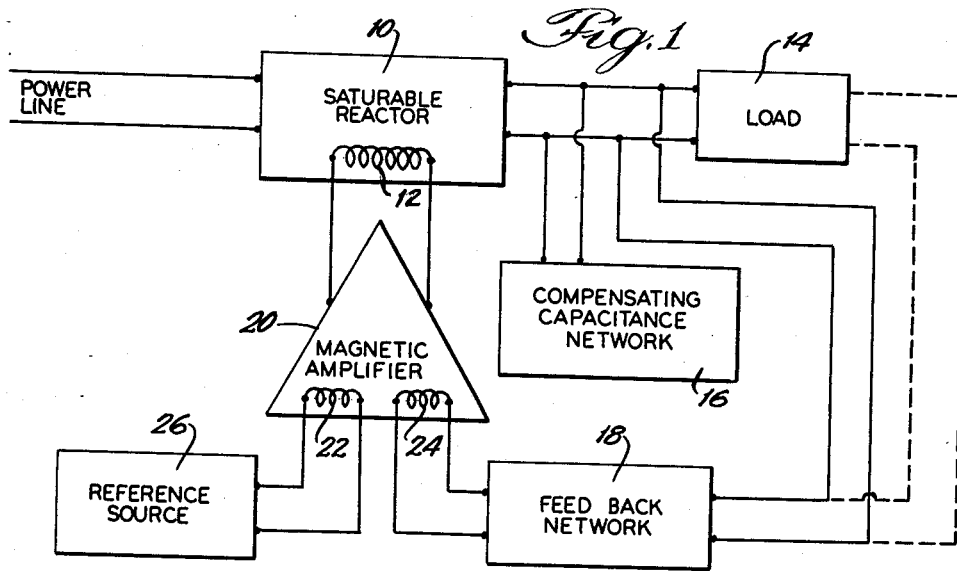
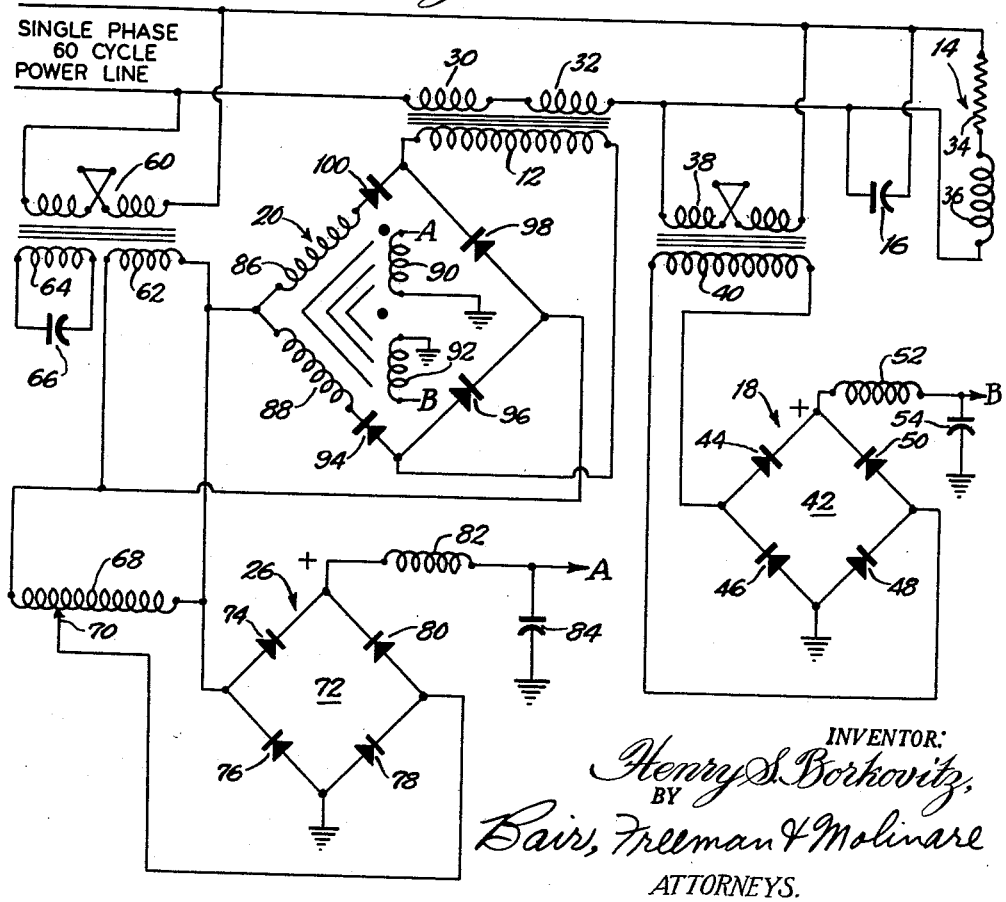
INVENTOR:
Henry S. Borkovitz,
BY
Bair, Freeman & Molinare
ATTORNEYS.

United States Patent Office 3,080,517
Patented Mar. 5, 1963

3,080,517
ELECTRICAL POWER CONTROL CIRCUITS
Henry S. Borkovitz, Chicago, Ill., assignor to Lindberg Engineering Company, a corporation of Illinois
Filed June 15, 1960, Ser. No. 36,394
7 Claims. (Cl. 323—66)

This application relates generally to power control circuits of the type utilizing saturable reactors, and more particularly, to new and improved circuit means to compensate for line voltage fluctuations in such power control circuits.

The use of saturable reactor devices in power control circuits is well known in the electrical control art. Such a device generally takes the form of a variable series reactance device comprising A.C. load windings and D.C. control windings wound on a core such that the current flow through the D.C. windings varies the saturation of the core and thereby changes the reactance of the A.C. windings. In those devices of the prior art with which applicant is familiar, the A.C. reactance decreases as the core saturation increases, and conversely, the A.C. reactance increases, as the core saturation decreases. In one specific application of such saturable reactor devices in the prior art, it is common to connect the load windings of a saturable reactor in series with the power source and the load to regulate the power applied to the load by controlling the saturating current flowing through the control winding.

It also is known that closed loop feedback techniques may be used to supply the control windings of a saturable reactor with the saturating current necessary to provide a desired load voltage proportional to some reference voltage. The prior art systems however, have not been entirely satisfactory due to their inability to supply maximum load voltage when the line voltage is below the rated voltage.

Accordingly, it is a general object of this invention to provide a new and improved saturable reactor control circuit capable of overcoming the deficiencies of the prior art systems.

More particularly, it is an object of this invention to provide a saturable reactor control circuit capable of maintaining a desired load voltage despite line voltage fluctuations, and even when the line voltage drops below the rated voltage value.

The above and other objects are attained in accordance with features of this invention wherein the saturable reactor is connected in a novel circuit arrangement including both capacitance and feedback networks. In one embodiment of the invention, the output of power source and the load windings of the saturable reactor are connected to the load, to compensating capacitance means, and to a feedback network having its output electrically annexed with the output of a reference source to apply a control signal to the control windings of the saturable reactor.

In the operation of the invention, as described in greater detail hereinbelow, the compensating capacitance means is in parallel with the load and also is in a series resonance circuit with the saturable reactor. Due to the series resonance and to its leading power factor, the compensating capacitance means increases the voltage applied to the load an amount sufficient to result in the desired load voltage with a minimum line voltage.

The voltage applied to the load also is applied to a feedback network which includes rectifying and filtering means to provide a D.C. feedback signal. This latter signal is mixed with a D.C. reference signal, as in a magnetic amplifier for example, and the resultant D.C. control signal is applied to the control windings of the saturable reactor to effect the desired regulation. It is a feature of this invention to provide a novel control circuit where maximum load voltage (as required under rated line conditions without compensation) can be reached at all line conditions within a permissible range from the rated conditions and where the minimum load voltage at all line conditions within the range effectively is unaffected.

Thus, it is another object of this invention to provide a saturable reactor control circuit for regulating load voltage under line voltage fluctuations which comprises a novel compensating capacitance and feedback arrangement.

It is a further object of this invention to provide an improved saturable reactor control circuit, as above, which is characterized by its efficiency, its flexibility and its highly advantageous construction and operation.

The above and other novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a drawing in block diagrammatic form of the saturable reactor control circuit comprising the invention; and FIGURE 2 is a schematic drawing of one specific illustrative embodiment of the invention particularly adapted for single phase operation.

Referring now to the drawing, and more particular to FIGURE 1 thereof, there is shown in block diagram form one preferred embodiment of the invention. As there illustrated, the power circuit of the invention comprises a saturable reactor 10 connected to a suitable source of power, such as a single phase or a polyphase A.C. power line. Advantageously, load windings of the saturable reactor 10 may be connected to the load 14 such that the saturable reactor is effectively in series between the power line and the load.

In accordance with a feature of this invention, a compensating capacitance network 16 is connected to the load 14. As explained in greater detail hereinbelow, the compensating capacitance network 16 connected to the load 14 serves to provide a leading power factor of a desired magnitude sufficient to enable the desired load voltage to be attained even under minimum line voltage conditions due to series resonance with the saturable reactor. It will be seen that the saturable reactor controlled power system can be compensated for line voltage fluctuations by the addition of the compensating capacitance network in parallel with the load and with the use of a feedback system as described hereinbelow to supply the control windings of the saturable reactor.

A feedback network 18 has its input connected to the load 14. Advantageously, feedback network 18 may be connected to the input of the load 14, as shown in solid lines, or if desired, the feedback network 18 may sense an output characteristic of the load 14 in the manner shown in dotted lines.

The output of feedback network 18 is connected to one input 24 of a magnetic mixing network, such as the magnetic amplifier 20. A source of reference voltage advantageously is connected to another input 22 of the magnetic amplifier mixing network 20. The output of the magnetic amplifier 20 is connected to the control windings 12 of the saturable reactor to complete a feedback loop comprising the feedback nework 18, the reference source 26, and the magnetic amplifier 20.

In accordance with the operation of this particular illustrative embodiment of the invention, the compensating capacitance network 16 serves to increase the voltage applied to the load 14 an amount sufficient to result in the desired load voltage with a minimum line voltage due to the series resonance of the compensating capacitance network and the saturable reactor. The voltage applied to the load 14 also is applied to the feedback network 18 which preferably includes rectifying and filtering means to convert the load voltage to a D.C. feedback signal. This D.C. feedback signal is mixed in the magnetic amplifier 20 with a D.C. reference signal obtained from the reference source 26 to provide a resultant D.C. control signal that is applied to the control windings 12 of the saturable reactor 10 to effect the desired load voltage control.

The details of one particular circuit embodiment of the block diagram of FIGURE 1 is shown in FIGURE 2 of the drawing. While this particular circuit diagram is shown for illustrative purposes only as comprising a single phase system, those skilled in the art will appreciate that the principles of the invention apply equally well to a polyphase system.

In the circuit of FIGURE 2, the single phase, 60 cycle power line is connected through the load windings 30 and 32 of the saturable reactor 10 to the load 14. The load 14 is shown as comprising a resistance 34 and an inductance 36, and those skilled in the art will appreciate that this particular illustrative load will be inductive in nature. A compensating capacitance network, symbolized by the capacitance 16, is connected in series with saturable reactor 10 and in parallel with the load 14 to increase the voltage applied to the load an amount sufficient to enable a desired load voltage to be applied to the load even under minimum line voltage conditions. This increase is due to the series resonance of the compensating capacitance network with the saturable reactor 10.

The feedback network 18 connected to the input of the load 14 is shown as comprising a transformer having the input windings 38 and the output windings 40. The output windings 40 are connected to a rectifying bridge 42 which includes the rectifiers 44, 46, 48 and 50, the input to the bridge 42 from the transformer being at the junction of rectifiers 44 and 46, and rectifiers 48 and 50, respectively. The junction of rectifiers 46 and 48 is connected to ground and the junction of rectifiers 44 and 50 is connected to a filter network comprising the inductance 52 and the capacitance 54. The rectifier bridge 42 serves as a full wave rectifier which converts the A.C. voltage to the load to a D.C. voltage which is filtered by the filter network comprised of inductance 52 and capacitance 54.

The output of the feedback network 18 and its associated filter, which output is identified at B, is applied to an input winding 92 of the magnetic amplifier 20. In addition to this D.C. feedback signal input, the magnetic amplifier 20 also receives a reference D.C. signal at its input winding 90 by means of the reference source 26, as described hereinbelow.

The primary winding 60 of a constant voltage transformer is connected to the power line and the secondary winding 62 of the constant voltage transformer is connected to a suitable variable voltage device, such as the winding 8 of a variable auto-transformer. In addition, the winding 8 of a variable voltage transformer may be provided with a constant voltage transformer secondary winding 64 to which a capacitance 66 is connected, in a manner well known in the art.

The output of the auto-transformer is taken from the wiper element 70 and is applied to the junction of rectifiers 78 and 80 of a rectifier bridge 72. The other terminal of the transformer winding 62 and auto-transformer winding 68 is connected to the junction of rectifiers 74 and 76 of the rectifier bridge 72.

The junction of rectifiers 76 and 78 is connected to ground, and the junction of rectifiers 74 and 80 in the bridge is connected to a filter network comprising the inductance 82 and the capacitance 84. It will now be undertsood that the reference source 26 serves to convert the A.C. voltage from the power line to a suitable variable D.C. reference signal which after being transformed, rectified and filtered is available at the terminal A where it is applied to the input winding 90 of the magnetic amplifier 20.

The magnetic amplifier is comprised of a saturable reactor including the control windings 90 and 92, the load windings 86 and 88, and the rectifiers 94, 96, 98 and 100 in a manner well known in the art. The magnetic amplifier serves to magnetically mix the voltage signal from the reference source and the voltage signal from the feedback network. This is effected by input winding 90 of the magnetic amplifier which is connected in series with the reference network 72, and by input winding 92 of the magnetic amplifier 20 which is connected in series with the feedback network 18.

The power input to the magnetic amplifier is taken directly across the output of the transformer secondary winding 62, said input being applied at the junction of the magnetic amplifier load windings 86 and 88, and at the junction of the rectifiers 96 and 98.

The output of the magnetic amplifier is taken from the junction of the rectifiers 94 and 96, and from the junction of the rectifiers 98 and 100. This output is applied directly to the terminal of the control winding 12 of saturable reactor 10.

Thus, it can now be seen that the invention serves to compensate a saturable reactor controlled system for line voltage fluctuations. In accordance with the teachings of the invention a condition can be obtained where the maximum load voltage under rated line conditions can be reached for all line conditions within an acceptable percentage of rated condition, and where the minimum voltage at all line conditions in the range essentially is unaffected. In addition, the system of the invention will compensate for variations in load impedance within a limited range.

While there has been shown and described a specific embodiment of the present invention, it will of course be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a power control circuit comprising a plurality of power conductors adapted to be connected to a line power source, a load for receiving power from said source, a saturable reactor having load windings and control windings, said load windings being connected between said conductors and said load, a compensating capacitance network connected to said load and in series resonance with said saturable reactor to compensate for line voltage variations from said power source, amplifier means having its output connected to the control windings of said saturable reactor, a feedback network having its input connected to said load and its output connected to one input of said amplifier means, and a source of reference voltage having its output connected to another input of said amplifier means.

2. The improvement of a power control circuit comprising a plurality of power conductors adapted to be connected to a line power source, an inductive-resistive load for receiving power from said source, a saturable reactor having load windings and control windings, said load windings being connected between said conductors and said inductive-resistive load, a compensating capacitance network connected between said load windings and said inductive-resistive load and in series resonance with said saturable reactor to compensate for line voltage variations from said power source, amplifier means having at least two inputs and an output, means connecting said output to the control windings of said saturable reactor, a feedback network having its input connected to said inductive-resistive load and its output connected to one input of said amplifier means, and a source of reference voltage having its output connected to another input of said amplifier means.

3. The improvement of a power control circuit comprising a plurality of power conductors adapted to be connected to a line power source, a load for receiving power from said source, a saturable reactor having load windings and control windings, said load windings being connected between said conductors and said load, a compensating capacitance network connected to said load and in series resonance with said saturable reactor to compensate for line voltage variations from said power source, and a feedback network including a source of reference voltage, said feedback network having its input connected to said load and its output connected to the control windings of said saturable reactor.

4. The improvement of a power control circuit comprising a plurality of power conductors adapted to be connected to a line power source, an inductive-resistive load for receiving power from said source, a saturable reactor having load windings and control windings, said load windings being connected between said conductors and said load, a compensating capacitance network connected between said load windings and said load and in series resonance with said saturable reactor to compensate for line voltage variations from said power source, a feedback network having its input connected to said load and its output connected to the control windings of said saturable reactor, said feedback network comprising transformer means connected to said load, a rectifier bridge connected to said transformer means, and a filter network connected to said rectifier bridge, and a source of reference voltage having its output connected to said feedback network.

5. The improvement of a power control circuit comprising a plurality of power conductors adapted to be connected to a line power source, an inductive resistive load for receiving power from said source, a saturable reactor having load windings and control windings, said load windings being connected between said conductors and said load, a compensating capacitance network connected to said load and in series resonance with said saturable reactor to compensate for line voltage variations from said power source, a magnetic amplifier having one output and two inputs, means connecting the output of said magnetic amplifier to the control windings of said saturable reactor, a feedback network having its input connected to said load and its output connected to one input of said amplifier means, and a source of reference voltage having its output connected to another input of said amplifier means.

6. The improvement of a power control circuit comprising a plurality of power conductors adapted to be connected to a line power source, a load for receiving power from said source, a saturable reactor having load windings and control windings, said load windings being connected between said conductors and said load, a compensating capacitance network connected to said load and in series resonance with said saturable reactor to compensate for line voltage variations from said power source, amplifier means having its output connected to the control windings of said saturable reactor, a feedback network having its input connected to said load and its output connected to one input of said amplifier means, and a source of reference voltage having its output connected to another input of said amplifier means, said source of reference voltage comprising a rectifier bridge connected to said line power source and a filter network connected to the output of rectifier bridge.

7. The improvement of a power control circuit comprising a plurality of power conductors adapted to be connected to a line power source, an inductive-resistive load for receiving power from said source, a saturable reactor having load windings and control windings, said load windings being connected between said conductors and said load, a compensating capacitance network connected to said load and in series resonance with said saturable reactor to compensate for line voltage variations from said power source, electrical mixing means having its output connected to the control windings of said saturable reactor, a feedback network having its input connected to said load and its output connected to one input of said electrical mixing means, and a source of reference voltage having its output connected to another input of said electrical mixing means.

References Cited in the file of this patent

UNITED STATES PATENTS

| | | |
|---|---|---|
| 2,078,880 | Logan | Apr. 27, 1937 |
| 2,435,573 | Bixby | Feb. 10, 1948 |